US009869813B2

(12) United States Patent
Choi et al.

(10) Patent No.: US 9,869,813 B2
(45) Date of Patent: Jan. 16, 2018

(54) BACKLIGHT UNIT, DISPLAY DEVICE COMPRISING THE SAME AND METHOD FOR MANUFACTURING THE SAME

(71) Applicant: Samsung Electronics Co., Ltd., Suwon-si, Gyeonggi-do (KR)

(72) Inventors: Yoonsun Choi, Yongin-si (KR); Jinho Lee, Suwon-si (KR); Kyuhwan Choi, Yongin-si (KR); Dong Kyung Nam, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 250 days.

(21) Appl. No.: 14/790,721

(22) Filed: Jul. 2, 2015

(65) Prior Publication Data
US 2016/0139327 A1    May 19, 2016

(30) Foreign Application Priority Data

Nov. 19, 2014    (KR) .......................... 10-2014-0161738

(51) Int. Cl.
*F21V 8/00*    (2006.01)
*G02B 27/22*    (2006.01)
*H04N 13/04*    (2006.01)

(52) U.S. Cl.
CPC ......... *G02B 6/0078* (2013.01); *G02B 27/225* (2013.01); *H04N 13/0411* (2013.01);
(Continued)

(58) Field of Classification Search
CPC ................ G02B 6/0078; G02B 27/225; H04N 13/0411; H04N 13/0413; H04N 13/0418;
(Continued)

(56) References Cited

U.S. PATENT DOCUMENTS 8,189,129 B2    5/2012  Eichenlaub
8,651,725 B2 *  2/2014  Ie ........................ G02B 6/0045
                                                    362/607
(Continued)

FOREIGN PATENT DOCUMENTS

JP    2013104916 A    5/2013
KR    20080113694 A    12/2008
(Continued)

OTHER PUBLICATIONS

Search Report for corresponding European Application No. 15179161.3 dated Apr. 22, 2016.
(Continued)

*Primary Examiner* — Laura Tso
(74) *Attorney, Agent, or Firm* — Harness, Dickey & Pierce, P.L.C.

(57) ABSTRACT

A backlight unit includes first light guide plates (LGPs) provided in a line shape, and second LGPs provided in a line shape and disposed between the first LGPs. The backlight unit may include a controller configured to control a plurality of light sources to provide a light to the first LGPs when a three-dimensional (3D) image is displayed on a display panel that receives the light from at least one of the first LGPs and the second LGPs, and to provide the light to the first LGPs and the second LGPs when a two-dimensional (2D) image is displayed on the display panel.

17 Claims, 13 Drawing Sheets

(52) U.S. Cl.
CPC ..... *H04N 13/0413* (2013.01); *H04N 13/0418* (2013.01); *H04N 13/0454* (2013.01); *H04N 13/0456* (2013.01); *H04N 13/0497* (2013.01); *H04N 13/0447* (2013.01)

(58) Field of Classification Search
CPC ........... H04N 13/0454; H04N 13/0456; H04N 13/0497; H04N 13/0447
USPC ........................................ 362/616, 615, 628
See application file for complete search history.

(56) References Cited

U.S. PATENT DOCUMENTS

| | | |
|---|---|---|
| 2006/0170833 A1 | 8/2006 | Lin et al. |
| 2007/0091638 A1 | 4/2007 | Ijzerman et al. |
| 2007/0216828 A1 | 9/2007 | Jacobs |
| 2012/0242568 A1 | 9/2012 | Kim et al. |
| 2013/0300957 A1 | 11/2013 | Inoue |

FOREIGN PATENT DOCUMENTS

| | | |
|---|---|---|
| KR | 20100026761 A | 3/2010 |
| KR | 101406794 B1 | 6/2014 |
| KR | 101406795 B1 | 6/2014 |

OTHER PUBLICATIONS

Masaru Minami et al., "Late-News Paper: Glasses-Free 2D/3D Switchable Display Using a Unique Ligh Guide", Magazine, 2011, p. 468-p. 471, SID 11 Digest.

\* cited by examiner

1000

BACKLIGHT UNIT, DISPLAY DEVICE COMPRISING THE SAME AND METHOD FOR MANUFACTURING THE SAME

CROSS-REFERENCE TO RELATED APPLICATION

This application claims the priority benefit of Korean Patent Application No. 10-2014-0161738, filed on Nov. 19, 2014, in the Korean Intellectual Property Office, the entire contents of which are incorporated herein by reference in its entirety.

BACKGROUND

1. Field

At least one example embodiment relates to a backlight unit, a display device including the backlight unit, and/or a method of manufacturing the backlight unit.

2. Description of the Related Art

In general, a three-dimensional (3D) image is based on stereo visual principles using two eyes of a person. A 3D image display includes a stereoscopic display and an autostereoscopic display. The autostereoscopic display achieves a 3D image by separating an image into a left image and a right image without using glasses, and uses, for example, a parallax barrier method and a lenticular method.

Here, in the case of the parallax barrier method and the lenticular method, once a design is completed, the design may not be readily modified and crosstalk between a left image and a right image may be relatively high. In addition, the parallax barrier method and the lenticular method may not achieve a two-dimensional (2D) display. That is, although the parallax barrier method and the lenticular method are capable of 2D display, the quality of a 2D image may be degraded.

SUMMARY

At least one example embodiment relates to a backlight unit.

According to an example embodiment, a backlight unit includes first light guide plates (LGPs) provided in a line shape, second LGPs provided in a line shape and disposed between the first LGPs, and a controller configured to control a plurality of light sources to provide a light to the first LGPs when a three-dimensional (3D) image is displayed on a display panel that receives the light from at least one of the first LGPs and the second LGPs, and to provide the light to the first LGPs and the second LGPs when a two-dimensional (2D) image is displayed on the display panel.

Example embodiments provide that the first LGPs and the second LGPs may be positioned on the same layer.

Example embodiments provide that the first LGPs and the second LGPs may be disposed to be in parallel with each other.

Example embodiments provide that the first LGPs and the second LGPs may be disposed to be symmetrical with respect to each other.

Example embodiments provide that the first LGPs and the second LGPs may be disposed to be point-symmetrical based on a center of the backlight unit.

Example embodiments provide that a width of the first LGP may be greater than a width of the second LGP.

Example embodiments provide that at least two second LGPs may be disposed between the first LGPs.

Example embodiments provide the backlight unit that may further include an air gap present between the first LGPs and the second LGPs.

Example embodiments provide that the first LGPs may be configured to emit the light toward the display panel by applying a directivity to the light incident from the plurality of light sources.

Example embodiments provide that a width of the first LGP may be determined based on a size of a pixel included in the display panel.

Example embodiments provide that a pitch of the first LGP may be determined based on the number of views of the 3D image displayed on the display panel.

Example embodiments provide that the plurality of light sources may be configured to selectively provide the light to the first LGPs and the second LGPs to partially display the 2D image or the 3D image on the display panel.

Example embodiments provide that the plurality of light sources may be configured to provide the light to the first LGPs corresponding to an area of the display panel on which the 3D image is displayed, and to provide the light to the first LGPs and the second LGPs corresponding to an area of the display panel on which the 2D image is displayed.

Example embodiments provide that the plurality of light sources may include first light sources configured to provide the light to the first LGPs and second light sources configured to provide the light to the second LGPs.

Example embodiments provide that the first light sources and the second light sources may be positioned on different sides of the backlight unit.

Example embodiments provide that the first light sources and the second light sources may be disposed on the same side of the backlight unit.

Example embodiments provide that the first LGPs and the second LGPs may be disposed to be slanted at a desired (or alternatively, predetermined) angle with respect to a pixel included in the display panel.

At least one example embodiment relates to a backlight unit.

According to another example embodiment, a backlight unit includes an LGP including first light guide elements in a line shape and second light guide elements in a line shape and disposed between the first light guide elements, and a controller configured to control a plurality of light sources to provide a light to the first light guide elements when a 3D image is displayed on a display panel that receives the light from the LGP, and to provide the light to the first light guide elements and the second light guide elements when a 2D image is displayed on the display panel.

At least one example embodiment relates to a display device.

According to still another example embodiment, a display device includes first LGPs provided in a line shape, second LGPs provided in a line shape and disposed between the first LGPs, a controller configured to control a plurality of light sources to provide a light to the first LGPs when a 3D image is displayed on a display panel that receives the light from at least one of the first LGPs and the second LGPs, and to provide the light to the first LGPs and the second LGPs when a 2D image is displayed on the display panel, and the display panel configured to display at least one of the 2D image and the 3D image using the light provided from the first LGPs and the second LGPs.

At least one example embodiment relates to a method.

According to still another example embodiment, a method of manufacturing a backlight unit includes forming first LGPs provided in a line shape and configured to apply a directivity to a light provided from a plurality of light sources, and to provide the light to a display panel, and forming second LGPs provided in a line shape and disposed between the first LGPs, the second LGPs being configured to emit light without applying directivity.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
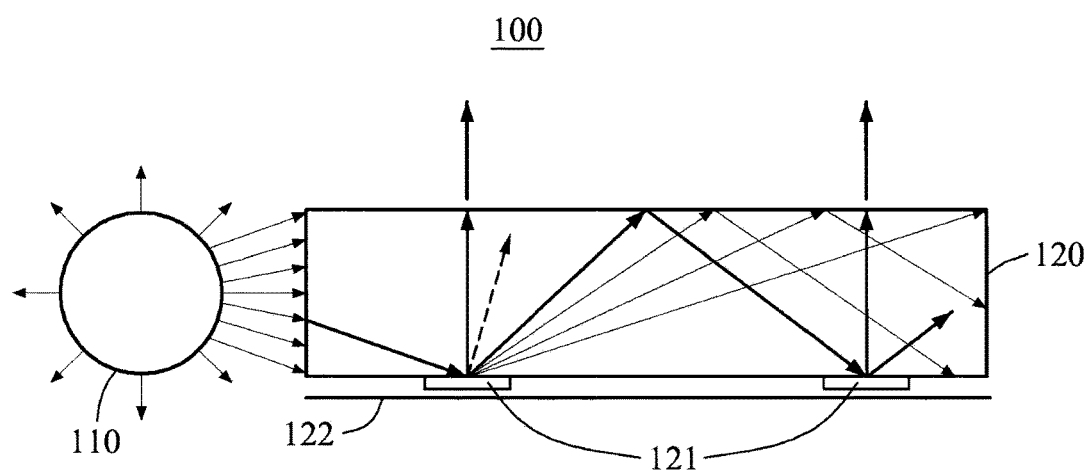
FIG. 1 is a diagram to describe an operation method of a backlight unit according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram to describe an operation method of a backlight unit 100 according to at least one example embodiment.

Referring to FIG. 1, the backlight unit 100 includes a light source 110 and a light guide plate (LGP) 120. The backlight unit 100 is positioned on a rear surface of a display panel and may provide a light to the display panel. The backlight unit 100 may be an edge-type backlight unit or a direct-type backlight unit. For concise description, the backlight unit 100 will be described based on the edge-type backlight unit. However, such a description does not limit the type of the backlight unit 100 and may be applicable to the direct-type backlight unit.

The light source 110 refers to a device to generate a light and may include, for example, a light emitting diode (LED). The light source 110 may provide the generated light to the display panel through the LGP 120. For example, as illustrated in FIG. 1, the light source 110 may be positioned on one side of the LGP 120. Alternatively, the light source 110 may be positioned on each of both sides of the LGP 120.

The LGP 120 refers to a device to guide the light incident from the light source 110 to the display panel. The LGP 120 may receive the light from the light source 110 through a light incident surface. For example, the LGP 120 may include polycarbonate (PC) or poly methyl methacrylate (PMMA). In FIG. 1, the light incident surface of the LGP 120 may be a left surface on which the light source 110 is positioned.

The LGP 120 guides the incident light based on a total reflection condition. When the light guided by the LGP 120 meets a light emitting pattern 121 positioned in a lower portion of the LGP 120, a progress angle of the light may be changed. A light that does not meet the total reflection condition in the light of which the progress angle is changed may be emitted toward the display panel (indicated by arrows extending out of LGP 120).

The LGP 120 may uniformly emit the light regardless of a distance from a position at which the light is emitted from the light source 110. For example, since the light not emitted from the LGP 120 toward the display panel is guided inside the LGP 120, the quantity of light to be guided may decrease according to an increase in a distance from the light source 110. Accordingly, the LGP 120 may emit the light using the light emitting pattern 121 in which a density decreases according to a decrease in the distance from the light source 110. The LGP 120 may emit the light using the light emitting pattern 121 in which a density increases according to an increase in the distance from the light source 110. Alternatively, the LGP 120 may emit the light using the light emitting pattern 121 in which an interval increases according to a decrease in the distance from the light source 110. Further, the LGP 120 may emit the light using light emitting pattern 121 in which an interval decreases according to an increase in the distance from the light source 110. The LGP 120 may uniformly emit the light using at least one of the aforementioned arrangements of the light emitting pattern 121. However, the description does not limit the range of example embodiments relating to an arrangement of the light emitting pattern 121.

Also, the LGP 120 may further include a reflector sheet 122 below the LGP 120. The reflector sheet 122 may reflect a light reaching a bottom so that the light guided by the LGP 120 may not be emitted toward a lower portion. For example, the reflector sheet 122 may also be disposed on the side of the LGP 120 to reflect the light so that the light guided by the LGP 120 may not be emitted toward a side. The reflector sheet 122 of FIG. 1 may serve to assist the light guided by the LGP 120 to be emitted toward the display panel through an upper portion of the LGP 120.

Figure 2:
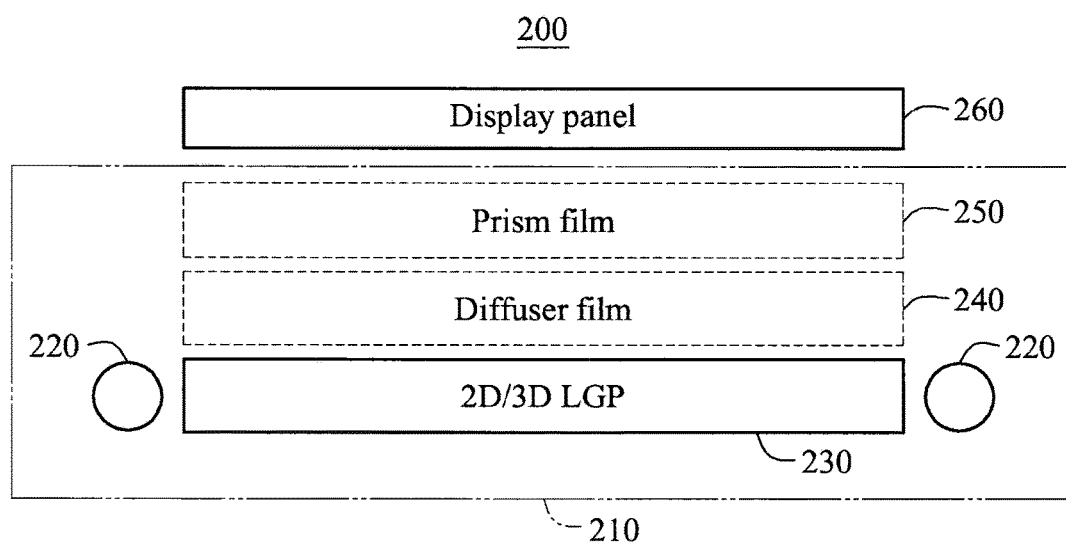
FIG. 2 illustrates a structure of a display device including a backlight unit according to at least one example embodiment.

FIG. 2 illustrates a structure of a display device 200 including a backlight unit 210 according to at least one example embodiment.

The display device 200 may include the backlight unit 210 and a display panel 260. The display device 200 may provide a 2D image or a 3D image to a user using the backlight unit 210 and the display panel 260.

The backlight unit 210 refers to a device to provide the light to the display panel 260, and includes a plurality of light sources 220 and a 2D/3D LGP 230. The backlight unit 210 may further include a diffuser film 240 and a prism film 250. Although not shown, the display device 200 may include a controller configured to selectively turn ON and OFF the plurality of light sources 220 based on whether a 2D image or a 3D image is being displayed. The controller may be included in the backlight unit 210.

Each of the plurality of light sources 220 refers to a device to generate the light and may include, for example, an LED. For example, as illustrated in FIG. 2, the plurality of light sources 220 may be disposed on both sides of the 2D/3D LGP 230, respectively. Alternatively, the plurality of light sources 220 may also be disposed on one side of the 2D/3D LGP 230.

The plurality of light sources 220 may selectively provide the light to the 2D/3D LGP 230 based on a form of an image displayed on the display panel 260. For example, when a 3D image is displayed on the display panel 260, the plurality of light sources 220 may provide the light to a first LGP providing a directional light to the display panel 260, in the 2D/3D LGP 230. When a 2D image is displayed on the display panel 260, the plurality of sources 220 may provide the light to the entire 2D/3D LGP 230. That is, each of the plurality of light sources 220 may be turned ON or OFF (e.g., by the controller) based on a form of an image displayed on the display panel 260.

The 2D/3D LGP 230 may emit the light incident from the plurality of light sources 220 toward the display panel 260. The 2D/3D LGP 230 may emit the light using a light emitting pattern for uniformly emitting the light, regardless of a distance from a position at which the light is emitted, to the light source 220.

The 2D/3D LGP 230 may include first LGPs and second LGPs. When the 3D image is displayed on the display panel 260, the first LGPs may emit the light incident from the plurality of light sources 220 toward the display panel 260. The first LGPs may emit the light toward the display panel 260 by applying a directivity to the light incident through a light incident surface. The first LGPs may emit the directional light toward the display panel 260 by applying the directivity to the light incident through the light incident surface. Since the display panel 260 receives the directional light from the first LGPs and displays the 3D image, the user may view the 3D image through the display device 200. Here, the first LGPs emit the directional light and thus, may operate as a line light source.

When the 2D image is displayed on the display panel 260, the first LGPs and the second LGPs may emit the light incident from the plurality of light sources 220 toward the display panel 260. The second LGPs may emit the light incident through the light incident surface toward the display panel 260 so that the light emitted from the first LGPs and the second LGPs may be uniformly provided to the display panel 260. The light reaching the display panel 260 may include the directional light emitted from the first LGPs. The second LGPs may emit the light so that the directivity may not appear in the entire light reaching the display panel 260. That is, the second LGPs may emit the light so that the directivity may be absent in the light provided from the 2D/3D LGP 230 to the display panel 260. Here, the 2D/3D LGP 230 emits the light in which the directivity is absent and thus, may operate as a surface light source.

According to at least one example embodiment, the 2D/3D LGP 230 may include a plurality of light guide elements in a line shape, as a single LGP. The 2D/3D LGP 230 may provide the light to the display panel 260 using at least one of the plurality of light guide elements. The plurality of light guide elements may include first light guide elements provided in a line shape and second light guide elements provided in a line shape and disposed between the first light guide elements. When a 3D image is displayed on the display panel 260, the plurality of light sources 22 may provide the light to the first light guide elements. When a 2D image is displayed on the display panel 260, the plurality of light sources 220 may provide the light to the first light guide elements and the second light guide elements. Hereinafter, for conciseness of description, a description will be made based on an example in which the 2D/3D LGP 230 includes two types of LGPs, for example, the first LGPs and the second LGPs. However, the description does not limit the example embodiments of the 2D/3D LGP 230.

The 2D/3D LGP 230 may further include at least one of a light emitting pattern and a reflector sheet. The description of FIG. 1 may be applicable to the light emitting pattern and the reflector sheet and thus, a further description will be omitted here.

A desired (or alternatively, predetermined) optical sheet capable of changing an optical characteristic such as a progress direction of light and a luminance of light may be present between the 2D/3D LGP 230 and the display panel 260. For example, the optical sheet may include the diffuser film 240 and the prism film 250, however, the scope of example embodiments is not limited thereto.

In general, the light emitted from the 2D/3D LGP 230 moves from a material having a relatively high refractive index to a material having a relatively low refractive index and thus, may have a refraction angle of 70 degrees or more with respect to a normal line. In this instance, the diffuser film 240 and the prism film 250 may control the progress direction of light so that the light is incident to the display panel 260 at zero degrees with respect to the normal line.

The diffuser film 240 and the prism film 250 may control the progress direction of light emitted from the 2D/3D LGP 260 and thus, may have a shape corresponding to the 2D/3D LGP 230.

The display panel 260 refers to a device to display a 2D image or a 3D image in response to an input image signal, and may be, for example, a flat panel display (FPD). The display panel 260 does not autonomously emit the light and thus, the display panel 260 may receive the light from the backlight unit 210. For example, the display panel 260 may include a liquid crystal panel to display an image in desired (or alternatively, predetermined) color using the light emitted from the backlight unit 210. The display panel 260 may include a plurality of pixels.

Figure 3:
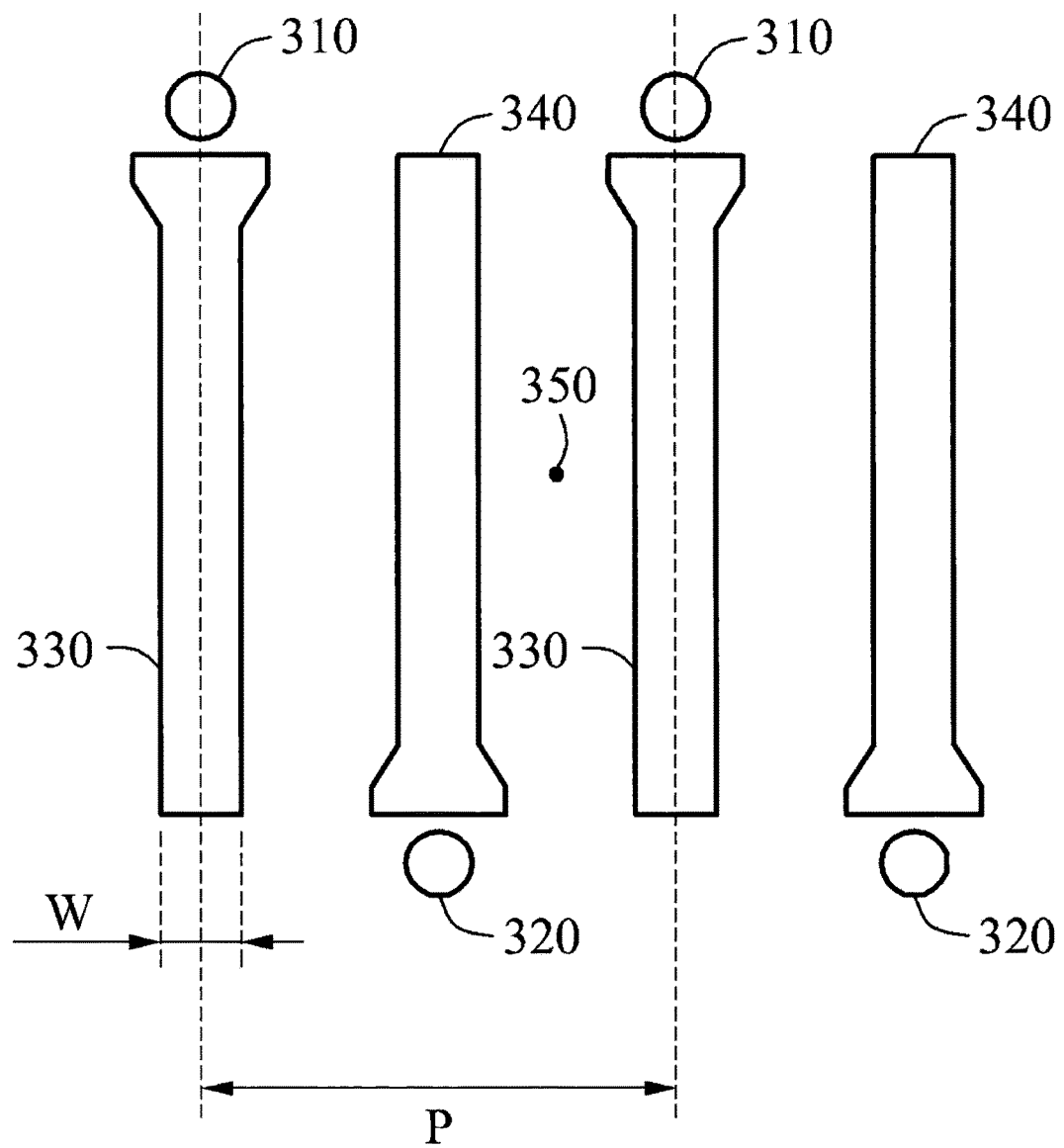
FIG. 3 illustrates an example of a backlight unit according to at least one example embodiment.

FIG. 3 illustrates an example of a backlight unit according to at least one example embodiment.

Referring to FIG. 3, the backlight unit may include first light sources 310, second light sources 320, first LGPs 330, and second LGPs 340. The first light sources 310 may provide a light to the first LGPs 330 provided in a line shape, and the second light sources 320 may provide the light to the second LGPs 340 provided in a line shape. The first light sources 310 and the second light sources 320 of FIG. 3 may be positioned on different sides of the backlight unit. Each of the first LGPs 330 and the second LGPs 340 may uniformly emit the light irrespective of a distance from each of the first light sources 310 and the second light sources 320.

Although FIG. 3 illustrates an example in which each of the first LGPs 330 and the second LGPs 340 includes two LGPs, it is only an example and thus, the number of the first LGPs 330 and the second LGPs 340 is no limited thereto.

The first LGPs 330 or the second LGPs 340 may guide a light incident from a light source of a corresponding LGP toward a display panel according to the description of FIG. 1.

The first LGPs 330 and the second LGPs 340 may be positioned on the same layer. The first LGPs 330 and the second LGPs 340 may be disposed to be in parallel with each other. The first LGPs 330 and the second LGPs 340 may be disposed to be symmetrical with respect to each other. For example, the first LGPs 330 and the second LGPs 340 may be disposed to be point-symmetrical based on a center 350 of the backlight unit. The first LGPs 330 and the second LGPs 340 may be alternately disposed. However, the description does not limit the scope of example embodiments relating to the arrangement of the first LGPs 330 and the second LGPs 340.

The first LGPs 330 may emit the light toward the display panel by applying a directivity to the light incident from the first light sources 310. The first LGPs 330 may be designed based on a 3D image technology applied to the display panel. For example, when designing the first LGPs 330, a width W and a pitch P may be considered. The first LGPs 330 are designed to be in a line shape based on the 3D image technology applied to the display panel and the light emitted from the first LGPs 330 is uniformly emitted respective of a distance from a light source. Accordingly, the first LGPs 330 may provide a directional light to the display panel.

The width W of the first LGP 330 may be determined based on a size of a pixel included in the display panel. The performance of the 3D image displayed on the display panel may be based on a ratio of a line width to a pixel width. The pixel width indicates a size of the pixel included in the display panel and the line width indicates the width of the first LGP 330. In general, the performance of the 3D image displayed on the display panel may be enhanced according to a decrease in the ratio of the line width to the pixel width. Accordingly, the width of the first LGP 330 may be determined based on the size of the pixel included in the display panel.

The pitch P of the first LGP 330 may be determined based on the number of views of the 3D image displayed on the display panel. For example, the 3D image displayed on the display panel may have one or more views (or viewing locations). That is, the display panel may also display a multi-view 3D image.

The second LGPs 340 may emit the light incident from the second light sources 320 toward the display panel. The second LGPs 340 may be designed to uniformly provide the light emitted from the second LGPs 340 toward the display panel.

For example, the second LGPs 340 and the first LGPs 330 may be alternately disposed. The second LGPs 340 may be disposed based on the same width and pitch of the first LGP 330.

An air gap may be present between the first LGP 330 and the second LGP 340. That is, the first LGP 330 and the second LGP 340 are spaced apart from one another. Due to the air gap, the first LGPs 330 and the second LGPs 340 are not in contact with each other.

FIGS. 4 through 9 illustrate another example of a backlight unit according to at least one example embodiment. For conciseness, in FIGS. 4 through 7 and FIG. 9, it is assumed that LGPs to receive a light from light sources positioned above refer to first LGPs and LGPs to receive a light from light sources positioned below refer to second LGPs.

The first LGPs may emit a light toward a display panel by applying a directivity to the light incident through a light incident surface. The second LGPs may emit the light incident through the light incident surface toward the display panel so that the light emitted from the first LGPs and the second LGPs may be uniformly provided toward the display panel.

Figure 4:
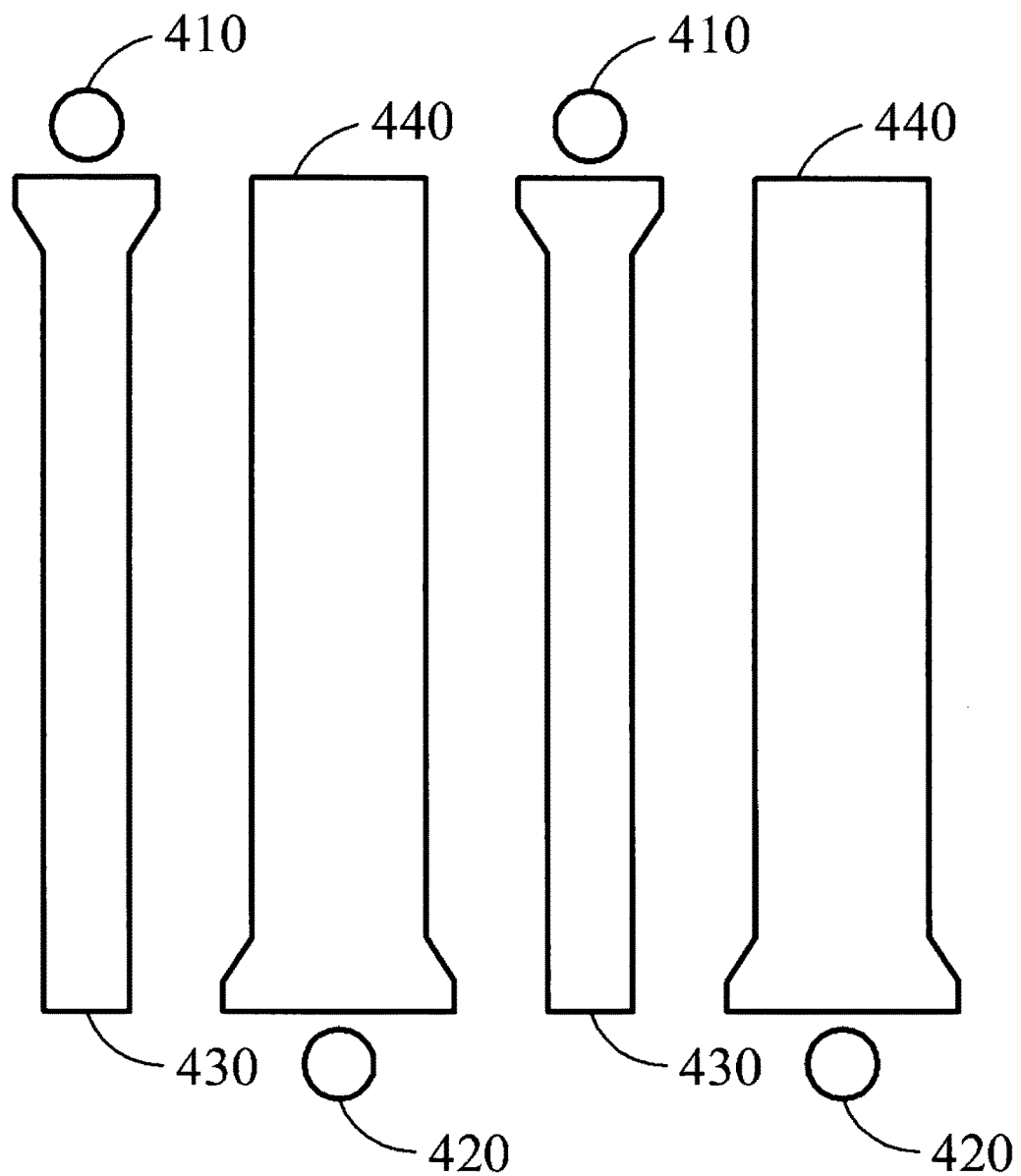
FIGS. 4 through 9 illustrate another example of a backlight unit according to at least one example embodiment.

Referring to FIG. 4, second LGPs 440 may be designed to have a width greater than first LGPs 430 and to have the same pitch as the first LGPs. First light sources 410 to provide the light to the first LGPs 430 and second light sources 420 to provide the light to the second LGPs 440 may be positioned on different sides of the backlight unit. The first LGPs 430 and the second LGPs 440 may be positioned on the same layer. The first LGPs 430 and the second LGPs 440 may be alternately disposed, may be disposed to be in parallel with each other, and may be disposed to be symmetrical with respect to each other. Further, the first LGPs 430 and the second LGPs 440 may be disposed to be point-symmetrical based on a center of the backlight unit.

Figure 5:
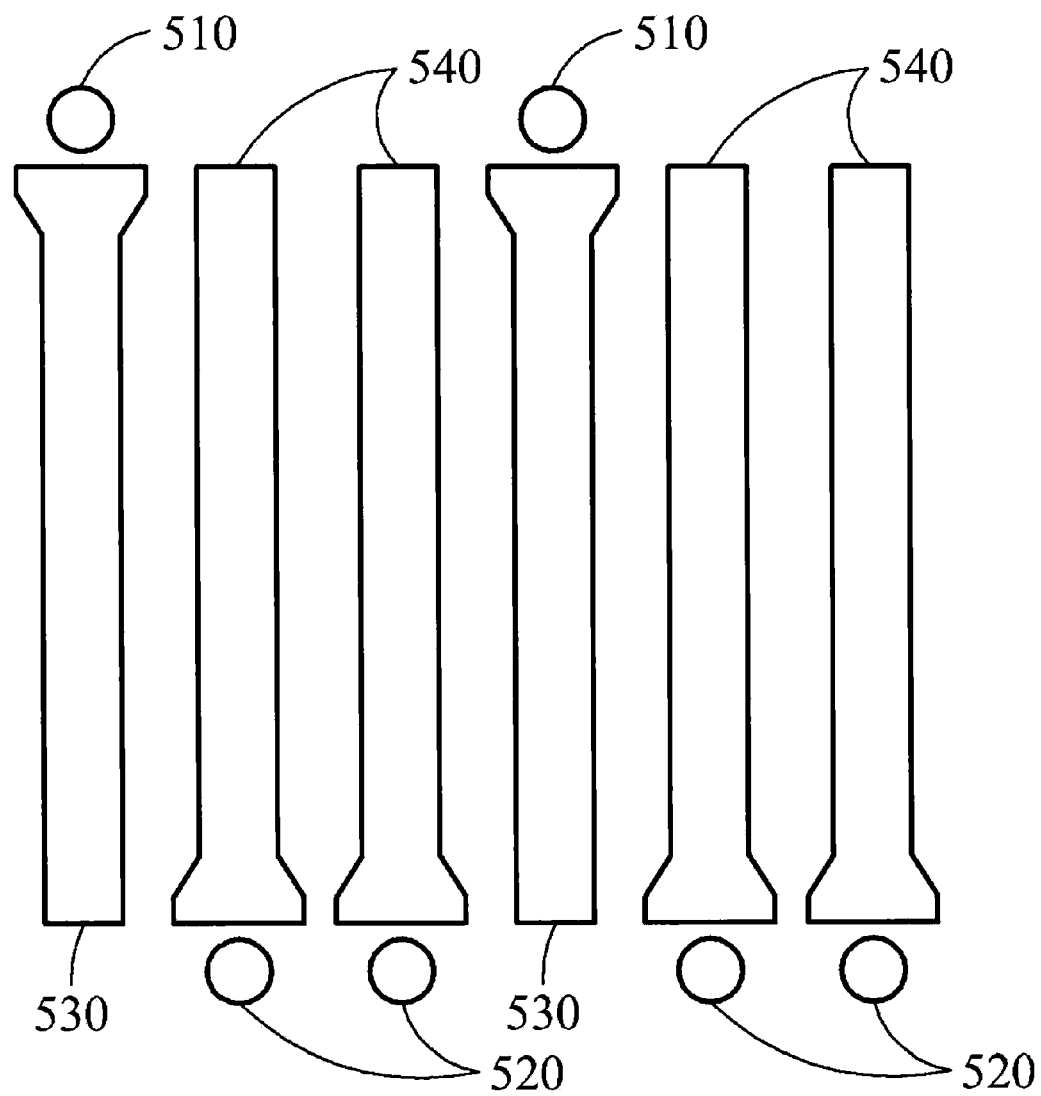

Referring to FIG. 5, second LGPs 540 may be designed to have the same width as first LGPs. Here, the second LGPs 540 may have an inconstant pitch, which is dissimilar to the first LGPs. That is, a plurality of second LGPs 540 may be disposed between the first LGPs. First light sources 510 to provide the light to the first LGPs 530 and second light sources 520 to provide the light to the second LGPs 540 may be positioned on different sides of the backlight unit. The first LGPs 530 and the second LGPs 540 may be positioned on the same layer and may be disposed to be in parallel with each other. The first LGPs 530 and the second LGPs 540 may be disposed in a form in which a group including a single first LGP and two LGPs is repeated. Further, the first LGPs 530 and the second LGPs 540 may be alternately disposed.

Figure 6:
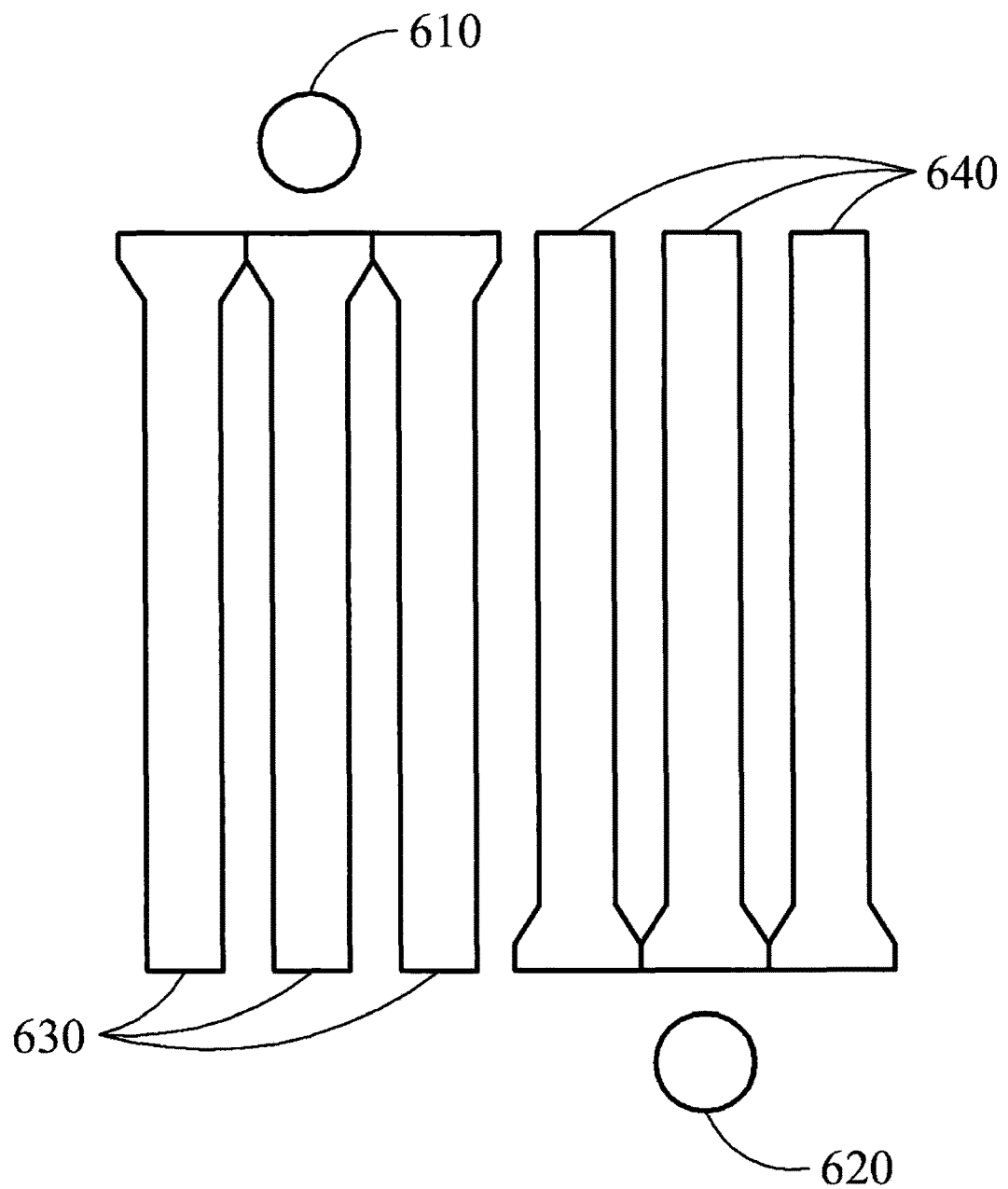

FIG. 6 illustrates an example in which three first LGPs 630 perform the functionality of a single first LGP of FIG. 3. Similarly, three second LGPs 640 may perform the functionality of a single second LGP of FIG. 3.

Referring to FIG. 6, the second LGPs 640 may be designed to have the same width as the first LGPs. First light sources 610 to provide the light to the first LGPs 630 and second light sources 620 to provide the light to the second LGPs 640 may be positioned on different sides of the backlight unit. In FIG. 6, a single first light source may provide the light to a plurality of first LGPs 630 and a single second light source may provide the light to a plurality of second LGPs. The first LGPs 630 and the second LGPs 640 may be positioned on the same layer, may be disposed to be in parallel with each other, and may be to be symmetrical with respect to each other. Further, the first LGPs 630 and the second LGPs 640 may be disposed to be point-symmetrical based on a center of the backlight unit. Three first LGPs 630 and three second LGPs 640 may be alternately disposed.

Figure 7:
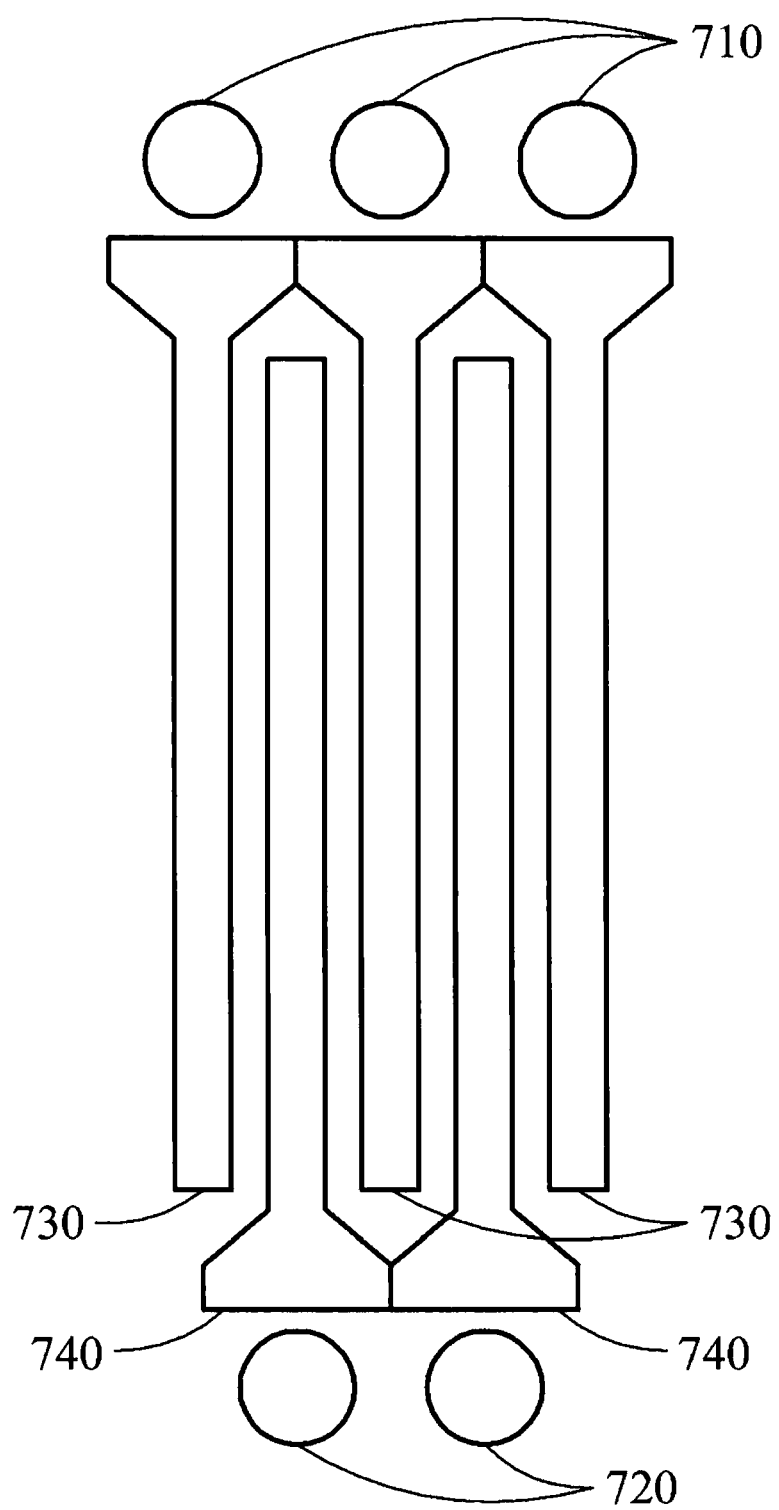

Referring to FIG. 7, first LGPs 730 and second LGPs 740 may be designed to have a pitch smaller than the first LGPs and the second LGPs of FIG. 3. That is, the first LGPs 730 and the second LGPs 740 may be densely disposed. Further, a plurality of first LGPs 730 may be disposed so that light incident surfaces through which the light is received from first light sources 710 are in contact with each other. Similarly, a plurality of second LGPs 740 may be disposed so that light incident surfaces through which the light is received from second light sources 720 are in contact with each other. The first light sources 710 to provide the light to the first LGPs 730 and the second light sources 720 to provide the light to the second LGPs 740 may be positioned on different sides of the backlight unit. The first LGPs 730 and the second LGPs 740 may be positioned on the same layer. The first LGPs 730 and the second LGPs 740 may be alternately disposed, may be disposed to be in parallel with each other, and may be disposed to be symmetrical with respect to each other. Further, the first LGPs 730 and the second LGPs 740 may be disposed to be point-symmetrical based on a center of the backlight unit.

Figure 8:
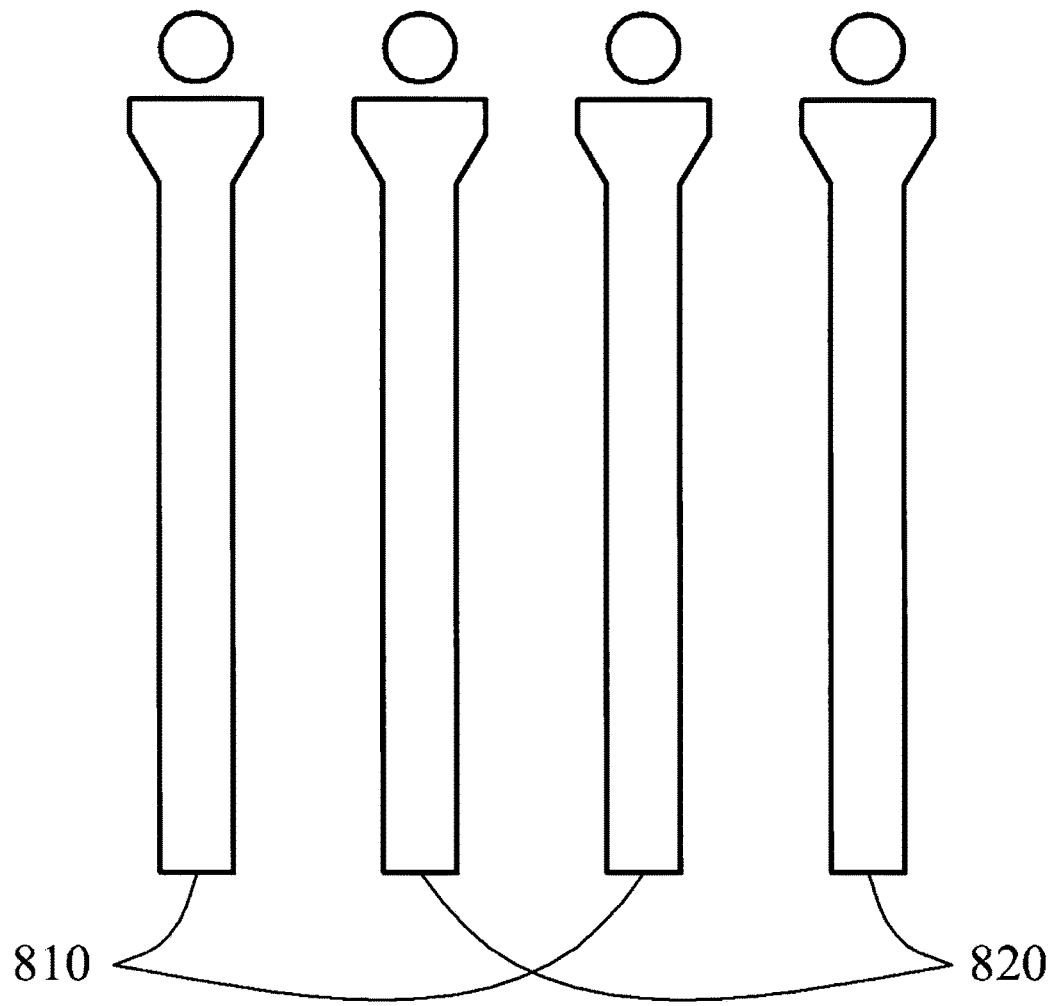

Referring to FIG. 8, light sources to provide a light to first LGPs 810 and second LGPs 820, respectively, may be positioned on the same side of the backlight unit. The first LGPs 810 and the second LGPs 820 may be positioned on the same layer.

Figure 9:
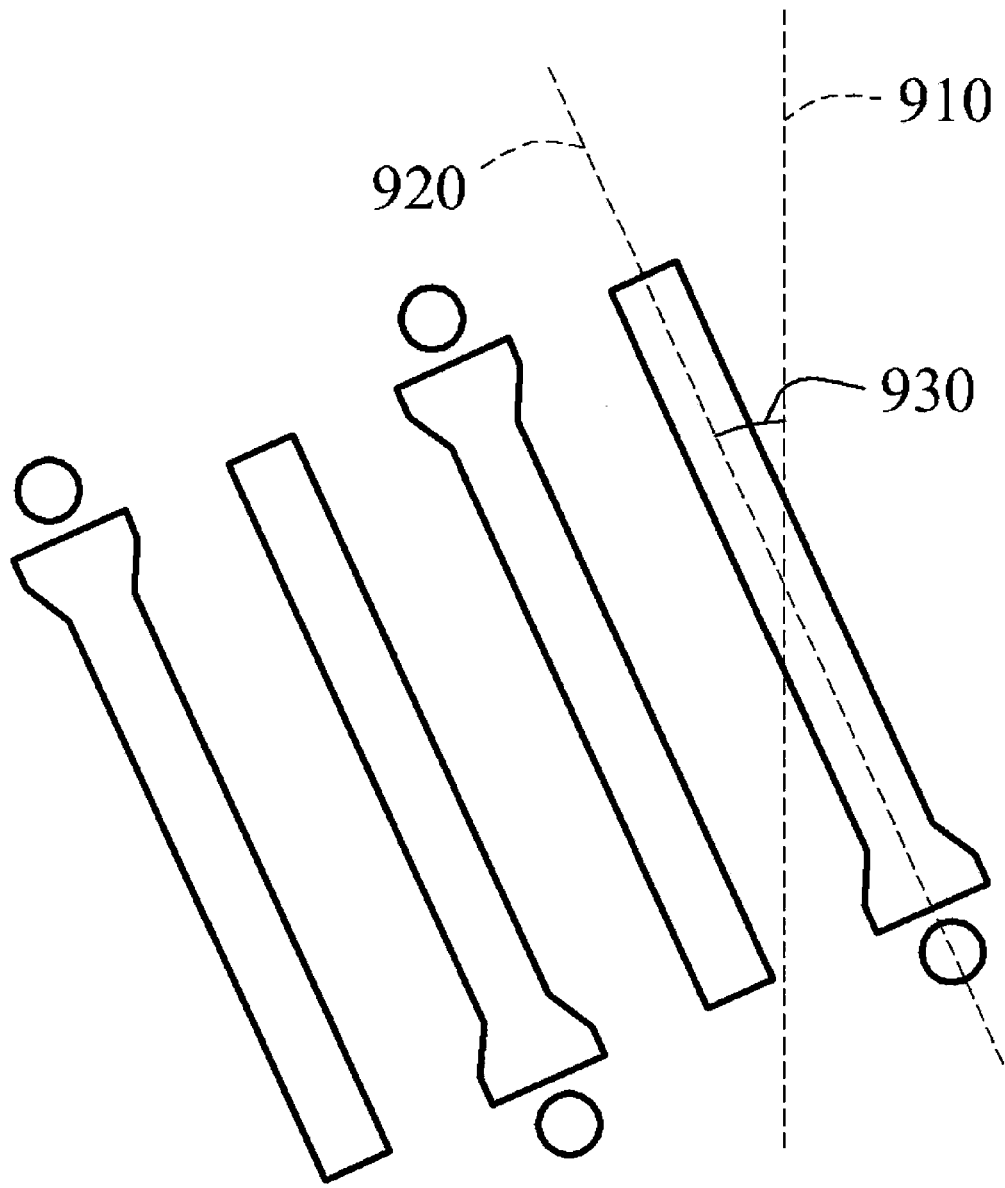

Referring to FIG. 9, first LGPs and second LGPs may be disposed to be slanted at a desired (or alternatively, predetermined) angle 930 with respect to a pixel included in a display panel. A first axis 910 may refer to one axis of the pixel included in the display panel and a second axis 920 may refer to one axis of the first LGP or the second LGP. The number of views of the 3D image displayed on the display panel may increase by disposing the first LGPs and the second LGPs to be slanted at the desired (or alternatively, predetermined) angle 930 with respect to the first axis 910.

Figure 10:
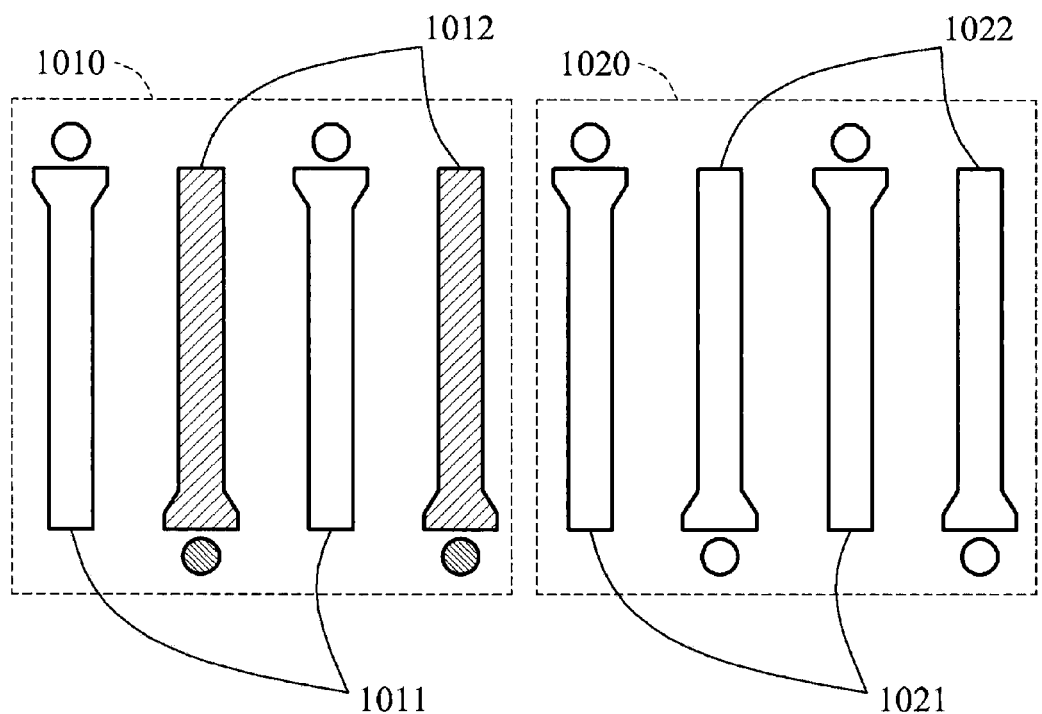
FIG. 10 illustrates an example of a display panel partially displaying a two-dimensional (2D) image or a three-dimensional (3D) image according to at least one example embodiment.

FIG. 10 illustrates an example of a display panel partially displaying a 2D image or a 3D image according to at least one example embodiment.

Referring to FIG. 10, a first area 1010 may refer to an area of the display panel on which the 3D image is displayed and a second area 1020 may refer to an area of the display panel on which the 2D image is displayed. A backlight unit 1000 may include first LGPs 1011 and 1021, second LGPs 1012 and 1022, and a plurality of light sources.

The 3D image may be displayed on the first area 1010. Here, the plurality of light sources may provide the light to the first LGPs 1011 corresponding to the first area 1010, and may not provide the light to the second LGPs 1012 corresponding to the first area 1010. The first LGPs 1011 corresponding to the first area 1010 may emit a directional light toward the first area 1010 of the display panel by applying a directivity to the light incident from the plurality of light sources.

The 2D image may be displayed on the second area 1020. Here, the plurality of light sources may provide the light to the first LGPs 1021 and the second LGPs 1022 corresponding to the second area 1020. The first LGPs 1021 corresponding to the second area 1020 may emit the light toward the second area 1020 of the display panel by applying a directivity to the light incident from the plurality of light sources. Due to the light emitted from the second LGPs 1022 corresponding to the second area 1020, the entire light reaching the second area 1020 of the display panel may be uniformly provided to the second area 1020.

Accordingly, the 3D image or the 2D image may be partially displayed on the display panel.

Figure 11:
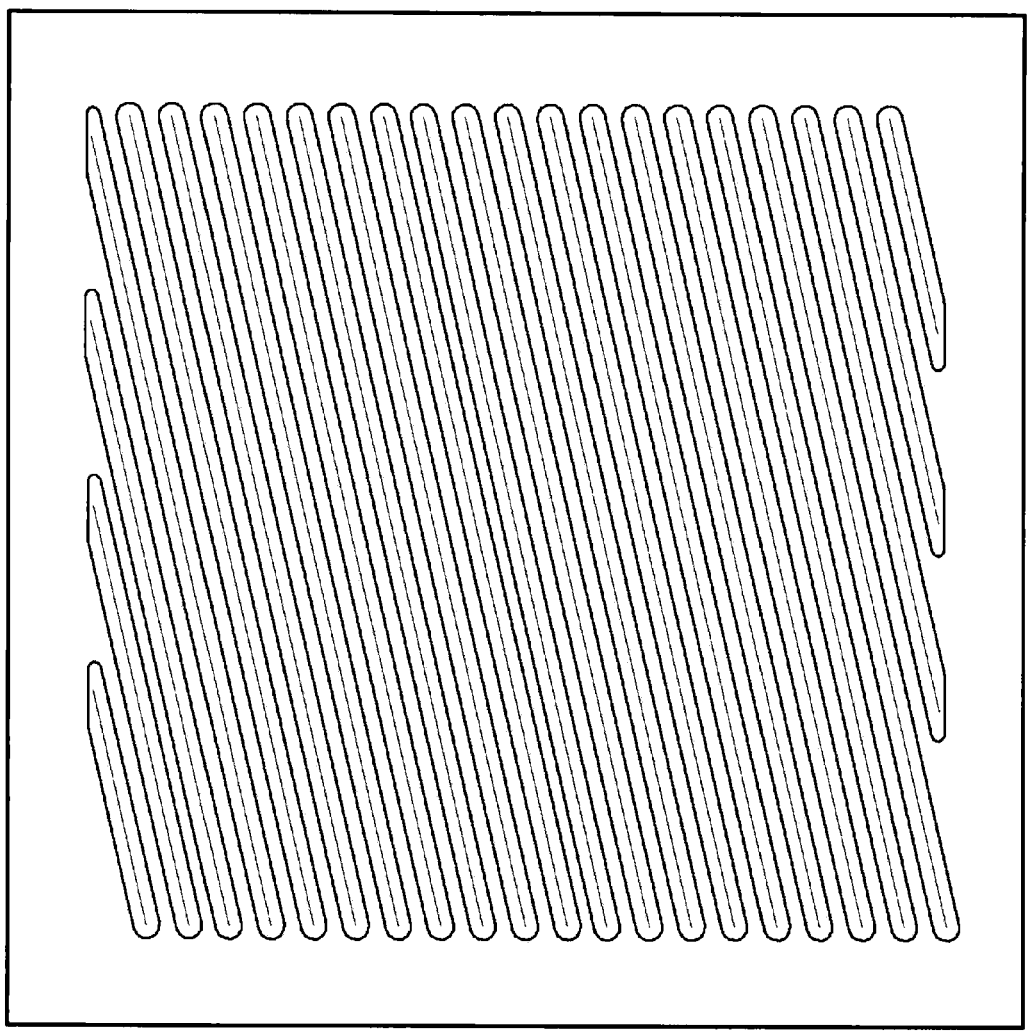
FIGS. 11 and 12 are diagrams to describe a property of a light provided from a backlight unit when a 3D image or a 2D image is displayed on a display panel according to at least one example embodiment.
Figure 12:
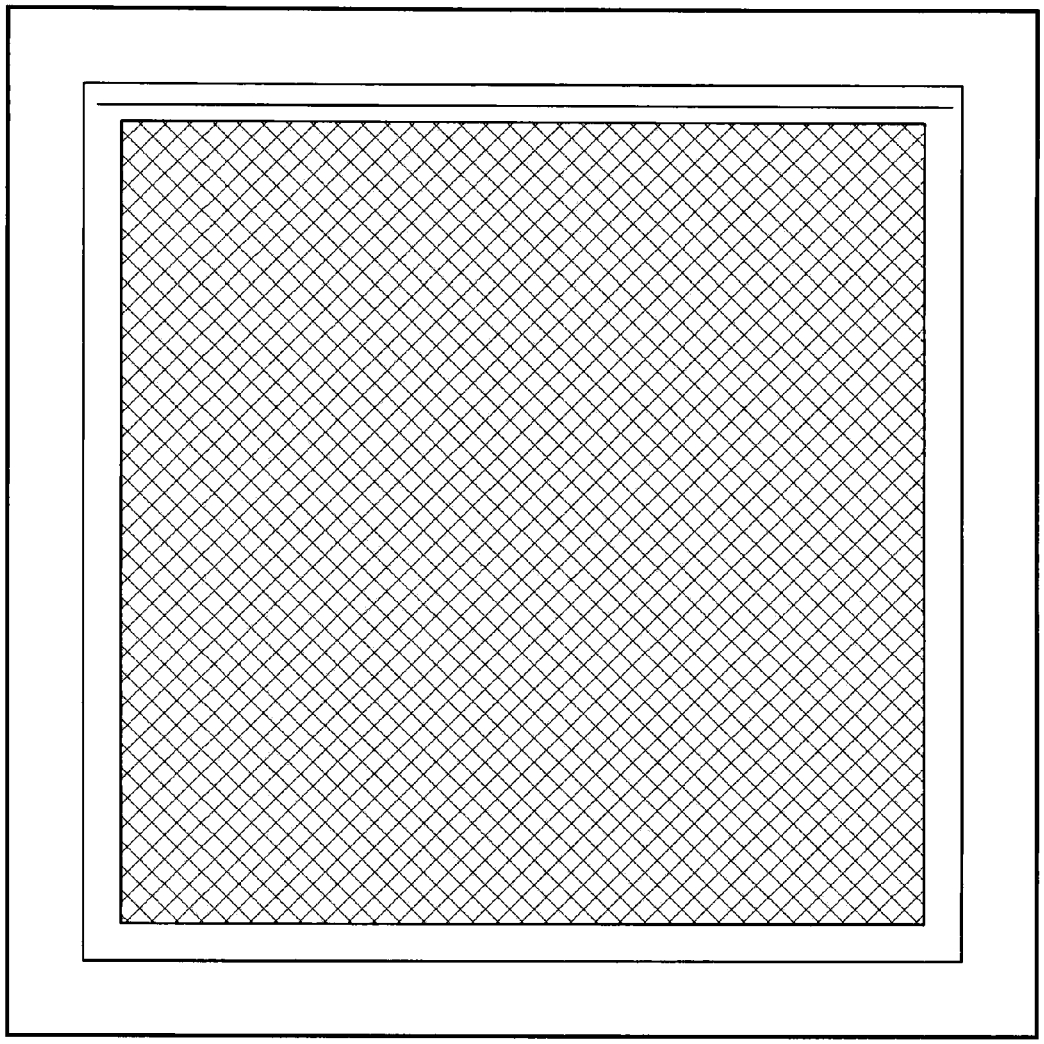

FIGS. 11 and 12 are diagrams to describe a property of a light provided from a backlight unit when a 3D image or a 2D image is displayed on a display panel according to at least one example embodiment.

Referring to FIG. 11, the display panel may receive a light from first LGPs configured to emit the light by applying a directivity to the light incident from a light source and may display the 3D image. Further, the display panel may receive a directional light from the first LGPs slanted at a desired (or alternatively, predetermined angle). The first LGPs to provide the light to the display panel emit the directional light and thus, operate as a line light source.

Referring to FIG. 12, the display panel may receive a light from first LGPs and second LGPs and may display the 2D image. Here, since a directional light emitted from the first LGPs is provided to the display panel together with a light emitted from the second LGPs, the display panel may receive the light in which the directivity is absent. That is, the first LGPs and the second LGPs to provide the light to the display panel may emit a directivity free light and thus, operate as a surface light source.

Figure 13:
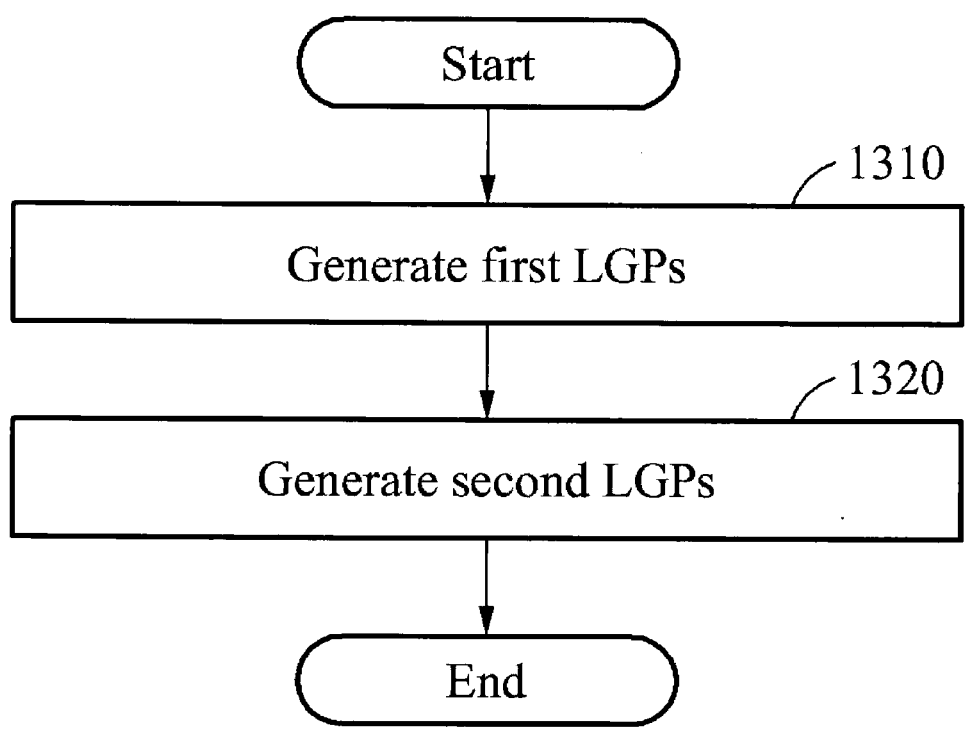
FIG. 13 is a flowchart illustrating a method of manufacturing a backlight unit according to at least one example embodiment.

FIG. 13 is a flowchart illustrating a method of manufacturing a backlight unit according to at least one example embodiment.

Referring to FIG. 13, a backlight unit manufacturing method performed by a backlight unit manufacturing apparatus may perform operation 1310 of generating (or forming) first LGPs provided in a line shape and configured to apply a directivity to a light provided from a plurality of light sources and to provide the light to a display panel, and operation 1320 of generating (or forming) second LGPs provided in a line shape and disposed between the first LGPs. Here, the plurality of light sources may provide a light to the first LGPs when a 3D image is displayed on the display panel that receives the light from at least one of the first LGPs and the second LGPs, and may provide the light to the first LGPs and the second LGPs when a 2D image is displayed on the display panel.

The description made above with reference to FIGS. 1 through 12 may be applicable to operations of FIG. 13 and thus, a further description will be omitted.

According to at least one example embodiment, a line light source required when providing a 3D image may be readily created by manufacturing LGPs included in a backlight unit to be in a line shape.

According to at least one example embodiment, there may be provided a backlight unit that enables switching between a 2D image and a 3D image displayed on a display panel to be easily performed by selectively providing a light to first LGPs and second LGPs in a line shape and configured to transfer the light to the display panel.

According to at least one example embodiment, a backlight unit having a thin form factor may be configured by disposing, on the same layer, first LGPs and second LGPs both provided in a line shape and included in a backlight unit.

According to at least one example embodiment, the number of views capable of being displayed on a display panel may increase by disposing first LGPs and second LGPs to be slanted at a desired (or alternatively, predetermined) angle.

According to at least one example embodiment, a display device including a display panel on which a 3D image or a 2D image is partially displayed may be provided by partially differently operating light sources configured to provide a light to first LGPs and second LGPs.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A backlight unit comprising:
   first light guide plates (LGPs) provided in a line shape;
   second LGPs provided in a line shape and disposed between the first LGPs; and
   a controller configured to control a plurality of light sources to provide light to the first LGPs if a three-dimensional (3D) image is being displayed on a display panel, and to provide light to the first LGPs and the second LGPs if a two-dimensional (2D) image is being displayed on the display panel,
   the display panel including at least a first area and a second area,
   the controller being further configured such that, when the 3D image is being displayed on the first area of the display panel while the 2D image is being displayed on the second area of the display panel, the controller controls the plurality of light sources to,
   provide light to LGPs, from among the first LGPs, that correspond to the first area of the display panel, and
   provide light to LGPs, from among the first LGPs and second LGPs, that correspond to the second area of the display panel.

2. The backlight unit of claim 1, wherein the first LGPs and the second LGPs are on a same layer.

3. The backlight unit of claim 1, wherein the first LGPs and the second LGPs are in parallel with each other.

4. The backlight unit of claim 1, wherein the first LGPs and the second LGPs are symmetrical with respect to each other.

5. The backlight unit of claim 4, wherein the first LGPs and the second LGPs are point-symmetrical with respect to a center of the backlight unit.

6. The backlight unit of claim 1, wherein widths of the second LGPs are greater than widths of the first LGPs.

7. The backlight unit of claim 1, wherein at least two second LGPs are disposed between the first LGPs.

8. The backlight unit of claim 1, wherein the first LGPs are spaced apart from the second LGPs.

9. The backlight unit of claim 1, wherein the first LGPs are configured to emit light toward the display panel by applying a directivity to light incident from the plurality of light sources.

10. The backlight unit of claim 1, wherein a width of the first LGP is determined based on a size of a pixel in the display panel.

11. The backlight unit of claim 1, wherein a pitch of the first LGP is determined based on a desired number of viewing locations for viewing the 3D image displayed on the display panel.

12. The backlight unit of claim 1, wherein the plurality of light sources comprises first light sources and second light sources, the first light sources being configured to provide the light to the first LGPs, the second light sources being configured to provide the light to the second LGPs.

13. The backlight unit of claim 12, wherein the first light sources and the second light sources are positioned on different sides of the backlight unit.

14. The backlight unit of claim 12, wherein the first light sources and the second light sources are disposed on a same side of the backlight unit.

15. The backlight unit of claim 1, wherein the first LGPs and the second LGPs are slanted at an angle with respect to a pixel comprised in the display panel.

16. A backlight unit comprising:
a light guide plate (LGP) including first light guide elements in a line shape and second light guide elements in a line shape, and the second light guide elements being between the first light guide elements; and
a controller configured to control a plurality of light sources to provide light to the first light guide elements if a three-dimensional (3D) image is being displayed on a display panel, and to provide light to the first light guide elements and the second light guide elements if a two-dimensional (2D) image is being displayed on the display panel.

17. A display device comprising:
first light guide plates (LGPs) provided in a line shape;
second LGPs provided in a line shape and disposed between the first LGPs;
a display panel configured to display at least one of a two-dimensional (2D) image and a three-dimensional (3D) image; and
a controller configured to control a plurality of light sources to provide light to the first LGPs if the 3D image is being displayed on the display panel, and to provide light to the first LGPs and the second LGPs if the 2D image is being displayed on the display panel,
the display panel including at least a first area and a second area,
the controller being further configured such that, when the 3D image is being displayed on the first area of the display panel while the 2D image is being displayed on the second area of the display panel, the controller controls the plurality of light sources to,
provide light to LGPs, from among the first LGPs, that correspond to the first area of the display panel, and
provide light to LGPs, from among the first LGPs and second LGPs, that correspond to the second area of the display panel.

* * * * *